July 1, 1924.  1,499,653
E. G. HAGADORN
NUTCRACKER
Filed Aug. 5, 1922
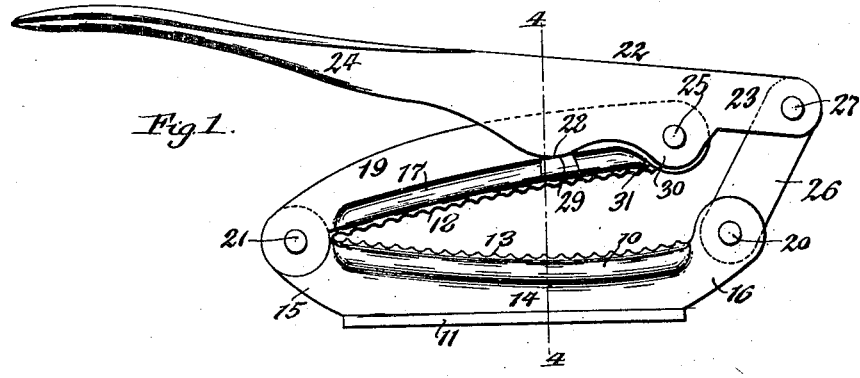
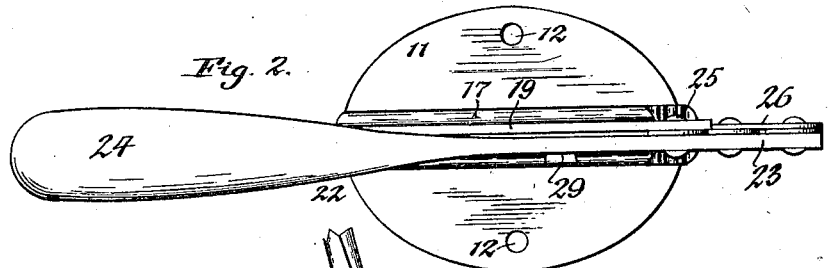
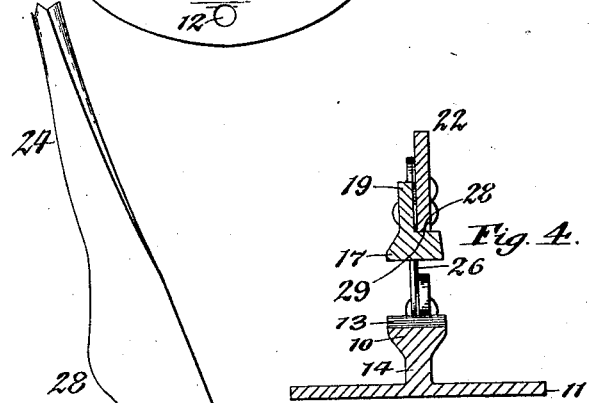
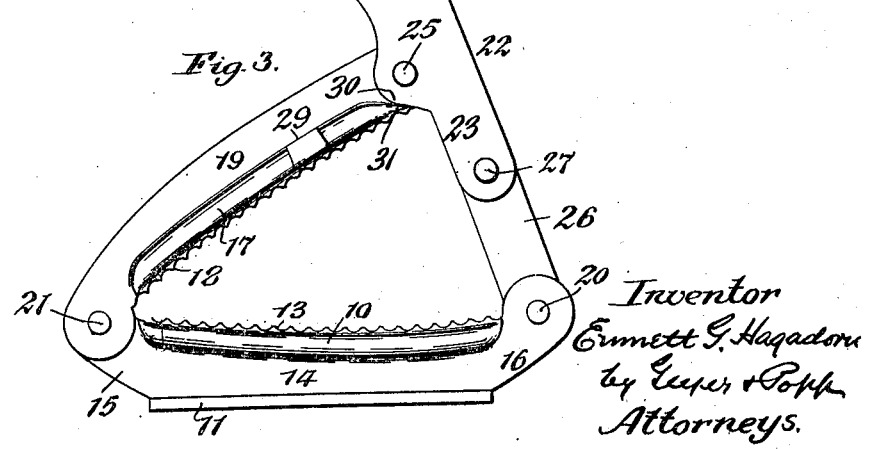
Inventor
Emmett G. Hagadorn
by Eeper & Popp
Attorneys.

Patented July 1, 1924.

1,499,653

UNITED STATES PATENT OFFICE.

EMMETT G. HAGADORN, OF BUFFALO, NEW YORK.

NUTCRACKER.

Application filed August 5, 1922. Serial No. 579,823.

*To all whom it may concern:*

Be it known that I, EMMETT G. HAGADORN, a citizen of the United States, residing at Buffalo, in the county of Erie and State of New York, have invented new and useful Improvements in Nutcrackers, of which the following is a specification.

This invention relates to certain improvements in nut crackers of the compound lever type.

It is an object of my invention to provide such a nut cracker which is adapted to be fixedly mounted on a table, or on a raised portion in the center of a nut bowl, or elsewhere.

A further object is to provide such a nut cracker which will crack all nuts with a minimum effort and without crushing them in the cracking operation.

An additional object is to provide a nut cracker so designed that it will reduce the danger of crushing the operator's fingers between the moving parts.

This invention also has the object of providing a nut cracker which is positive and reliable in operation and which is compact and neat in appearance, rendering it a desirable adjunct to the household equipment.

In the accompanying drawings:

Figure 1 is a side elevation of my improved nut cracker, showing the jaws thereof in their closed position. Figure 2 is a top plan view of the same. Figure 3 is a view similar to Fig. 1, but showing the jaws in their open position and the operating lever in its raised position. Figure 4 is a vertical transverse section taken on line 4—4, Fig. 1.

Similar characters of reference indicate corresponding parts in the several views.

In its general organization, my improved nut cracker consists of upper and lower jaws which are moved toward and from each other by a lever and link mechanism. The lower fixed jaw 10 is mounted on a base 11 which is preferably flat and extends transversely of the jaw. This base may be made in any suitable shape, that shown in the drawings being oval, and it is adapted to be fastened to a flat surface, such as a board, table, or a raised portion in the center of a nut bowl, by any suitable means, as by providing holes 12 in the base adapted to receive screws to fasten it thereto. The lower fixed jaw is provided with a longitudinal row of serrations or teeth 13 on its upper gripping face so as to firmly hold the nut to be cracked, and the same is supported on the base by a web 14, the jaw and web preferably being formed integrally with the base by casting the same of metal. At its front and rear ends the lower jaw is provided with lugs 15 and 16 which extend lengthwise and upwardly from the same.

The upper movable jaw 17 is toothed or serrated on its under gripping face, as shown at 18, similarly to the fixed jaw, and of equal width, and is mounted on the relatively thin rock arm 19. The upper jaw arm is arranged lengthwise over the lower jaw and is pivoted at its front end to the lug 15 by a rivet 21.

22 represents an operating lever arranged lengthwise over the upper jaw arm and pivoted between its short rear arm 23 and its long front arm 24 by a transverse rivet 25 to the rear end of the jaw arm.

An upright link 26 is pivoted at its lower end to the rear lug 16 of the base by a rivet 20, and is pivoted at its upper end to the short rear arm of the operating lever by a rivet 27. This lever extends over the jaws of the nut cracker, as shown in Fig. 1, and is suitably formed at its free front end to render it comfortable and convenient to operate as a handle. A rounded projection or stop 28 is formed on the underside of the front arm of the operating lever which is adapted to come in contact with a corresponding projection or stop 29 on the upper side of the movable jaw at a predetermined point in the downward movement of the operating lever and thus limit the downward movement of the lever and upper jaw, so that a gap will always be left between the front arm or handle of the operating lever and the upper jaw arm in the closed position of the nut cracker. This prevents the operator's fingers from being crushed between the handle and upper jaw when a nut suddenly gives way to the pressure of the jaws. The pivot 25 is placed in a depending projection 30 on the operating lever which lug engages with a shoulder 31 at the rear end of the upper jaw lever to limit the upward movement of the operating lever, as shown in Fig. 3.

By extending the operating lever over the jaws, the nut cracker is rendered more compact, taking up less space in storage, and the device being mounted, the operator can use his weight to better advantage in cracking unusually hard nuts, without tipping or upsetting the device.

Furthermore, by providing the novel means for limiting the motion of the lever, the device is rendered safe, inasmuch as it is impossible to crush the operator's fingers.

It is readily apparent that my device is simple, strong, compact and inexpensive, and that it enables nuts to be quickly and easily cracked the shells of which are very hard without crushing the meat thereof.

I claim as my invention:

A nut cracker comprising a stationary lower face provided on its upper side with a fixed jaw, an upper vertically movable jaw arranged above the fixed jaw and pivotally connected therewith at one of its ends, a link pivoted at one end of the opposite end of said lower jaw, and a hand lever pivotally connected between its ends to the other end of the upper jaw and having an outwardly projecting arm pivoted to the other end of said link and an inner arm adapted to project over the upper jaw in the closed position of the nut cracker.

EMMETT G. HAGADORN.